United States Patent
Vicari et al.

(10) Patent No.: US 12,012,990 B2
(45) Date of Patent: Jun. 18, 2024

(54) BUSHING ASSEMBLY

(71) Applicant: FCA ITALY S.p.A., Turin (IT)

(72) Inventors: Marcello Vicari, Turin (IT); Danilo Raffaele Iacovangelo, Turin (IT); Saverio Gariano, Turin (IT)

(73) Assignee: FCA ITALY S.p.A., Turin (IT)

( * ) Notice: Subject to any disclaimer, the term of this patent is extended or adjusted under 35 U.S.C. 154(b) by 393 days.

(21) Appl. No.: 17/334,581

(22) Filed: May 28, 2021

(65) Prior Publication Data
US 2021/0372458 A1  Dec. 2, 2021

(30) Foreign Application Priority Data
Jun. 1, 2020  (EP) .................................. 20177709

(51) Int. Cl.
*F16B 37/04* (2006.01)
*F16C 17/02* (2006.01)

(52) U.S. Cl.
CPC ............ *F16C 17/02* (2013.01); *F16B 37/044* (2013.01)

(58) Field of Classification Search
CPC ..................................... F16B 37/044
USPC ................................... 411/111–113
See application file for complete search history.

(56) References Cited

U.S. PATENT DOCUMENTS

| | | | | |
|---|---|---|---|---|
| 2,243,923 A | * | 6/1941 | Swanstrom | F16B 37/044 411/113 |
| 2,455,145 A | * | 11/1948 | Swanstrom | F16B 37/044 411/85 |
| 2,815,789 A | * | 12/1957 | Hutson | F16B 37/044 411/965 |
| 2,908,311 A | * | 10/1959 | Garman | F16B 37/044 411/103 |

(Continued)

FOREIGN PATENT DOCUMENTS

| DE | 20316765 U1 | 12/2003 |
|---|---|---|
| DE | 102015000205 A1 | 7/2016 |

(Continued)

OTHER PUBLICATIONS

European Search Report issued in priority Europan Patent Application No. 20177709 dated Oct. 19, 2020 (7 pages).

*Primary Examiner* — Flemming Saether
(74) *Attorney, Agent, or Firm* — Harness, Dickey & Pierce, P.L.C.

(57) ABSTRACT

A bushing assembly comprises a bushing element having a first surface, which is adapted to come into contact with a shoulder, and a threaded hole, which defines and axis and is adapted to be engaged by a screw; and a cage element, which is fitted around the bushing element so that the bushing element is supported and is floating; the cage element is adapted to be fixed to the shoulder and is provided with at least one opening; the opening defines an end abutment of the cage element; the bushing element comprises at least one stop portion, which engages the opening with an angular (Continued)

clearance and is movable around the axis at least between a first angular position, in which the stop portion is spaced apart from the abutment, and a second angular position, in which the stop portion is in contact with the abutment so as to prevent the bushing element from rotating past the second angular position; the stop portion is defined by an appendage element, which is distinct from the surface and the surface is circular.

18 Claims, 4 Drawing Sheets

(56) References Cited

U.S. PATENT DOCUMENTS

| | | | | |
|---|---|---|---|---|
| 3,461,937 | A * | 8/1969 | Finney | F16B 37/044 |
| | | | | 411/111 |
| 3,537,499 | A * | 11/1970 | Dey | F16B 37/044 |
| | | | | 411/111 |
| 5,630,686 | A | 5/1997 | Billmann | |
| 7,101,135 | B2 * | 9/2006 | Hassed | F16B 5/0216 |
| | | | | 411/432 |
| 9,080,592 | B2 * | 7/2015 | Oberndorfer | F16B 37/044 |
| 9,360,039 | B2 * | 6/2016 | Endt | B21K 1/701 |

FOREIGN PATENT DOCUMENTS

| | | |
|---|---|---|
| EP | 3133305 A1 | 2/2017 |
| FR | 1052272 A | 1/1954 |

* cited by examiner

BUSHING ASSEMBLY

CROSS-REFERENCE TO RELATED APPLICATIONS

This Patent application claims priority from European Patent Application No. 20177709.1 filed on Jun. 1, 2020, the entire disclosure of which is incorporated herein by reference.

TECHNICAL FIELD

The invention relates to a bushing assembly.

BACKGROUND ART

Bushing assemblies are normally used for the tightening of screws, so as to lock two components to one another.

Known bushing assemblies generally comprise:
a cage element, which is adapted to be fixed to a shoulder of one of the two components; and
a bushing element, which is supported by the cage element in a floating manner, is adapted to come into contact with the shoulder and comprises a threaded hole, which is adapted to be engaged by a screw.

The bushing assemblies are pre-mounted on the shoulder, so as to facilitate mounting operations. In detail, before the screw is inserted into the threaded hole, the cage element is fixed to the shoulder.

The screw is tightened to the bushing assembly in a later moment, for example following painting operations.

A bushing assembly of this type is known from U.S. Pat. No. 5,630,686.

The bushing element and the cage element shown in US-A-5630686 are shaped so as to prevent the bushing element from freely rotating integrally with the screw when the screw is being screwed into the threaded hole.

In this way, during the screwing, the bushing element does not need to be held still relative to the screw by an operator or by machinery.

In detail, the bushing element comprises a flange with a substantially rectangular shape, which is adapted to come into contact against the shoulder. Furthermore, the inner surfaces of the cage element serve as abutments for two sides of the flange, which are aimed at limiting the rotation thereof.

However, given the same pull on the screw, which is exerted by means of a tightening torque during mounting operations, the solution shown in U.S. Pat. No. 5,630,686 does not allow for an optimization of the resistant torque countering the unscrewing of the screw and, hence, the uncoupling of the components during their normal use. The resistant torque strictly depends on the extension of the surface of the flange of the bushing element placed in contact with the shoulder.

In particular, it should be taken into account that the bushing assembly is generally placed in a suitable seat obtained in the shoulder, whose dimensions are defined during the designing phase. As a consequence, the dimensions of the flange—and, hence, the value of the contact surface thereof—depend on the dimensions of the seat.

Other examples of bushing assemblies are known from EP-A1-3133305 and FR-A-1052272.

Therefore, in the industry, a bushing assembly is needed, which is capable of maximizing the anti-unscrewing resistant torque, ensuring at the same time easiness of mounting.

DISCLOSURE OF INVENTION

It is an object of the present invention to provide a bushing assembly, which fulfils the need discussed above in a simple and economic manner.

According to the invention, there is provided a bushing assembly as claimed in claim 1.

BRIEF DESCRIPTION OF THE DRAWINGS

The invention will be best understood upon perusal of the following detailed description of a preferred embodiment, which is provided by mere way of non-limiting example, with reference to the accompanying drawings, in which.

BEST MODE FOR CARRYING OUT THE INVENTION

Figure 1:
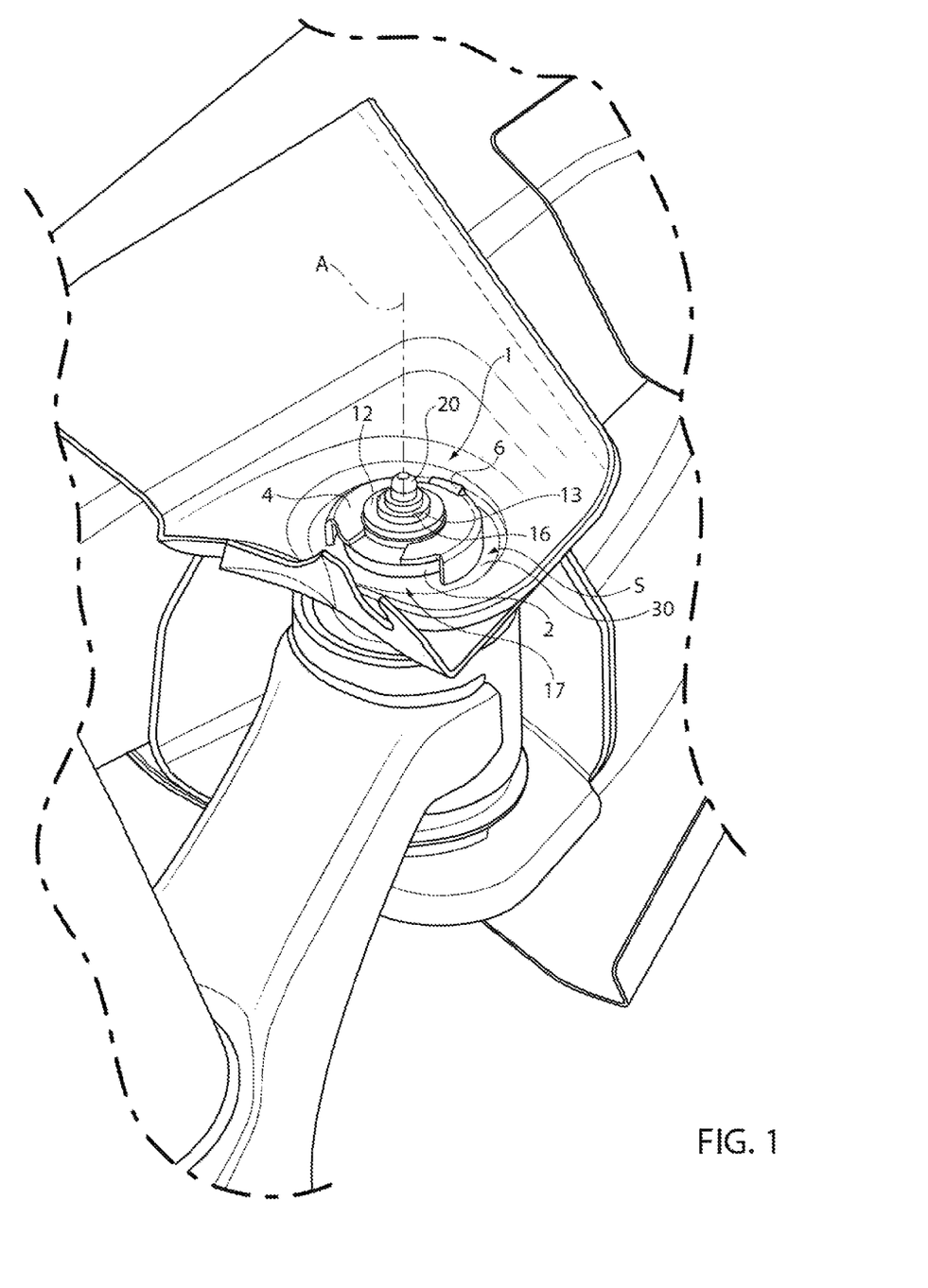
FIG. 1 is a perspective view of a bushing assembly according to the invention placed on a shoulder.
Figure 2:
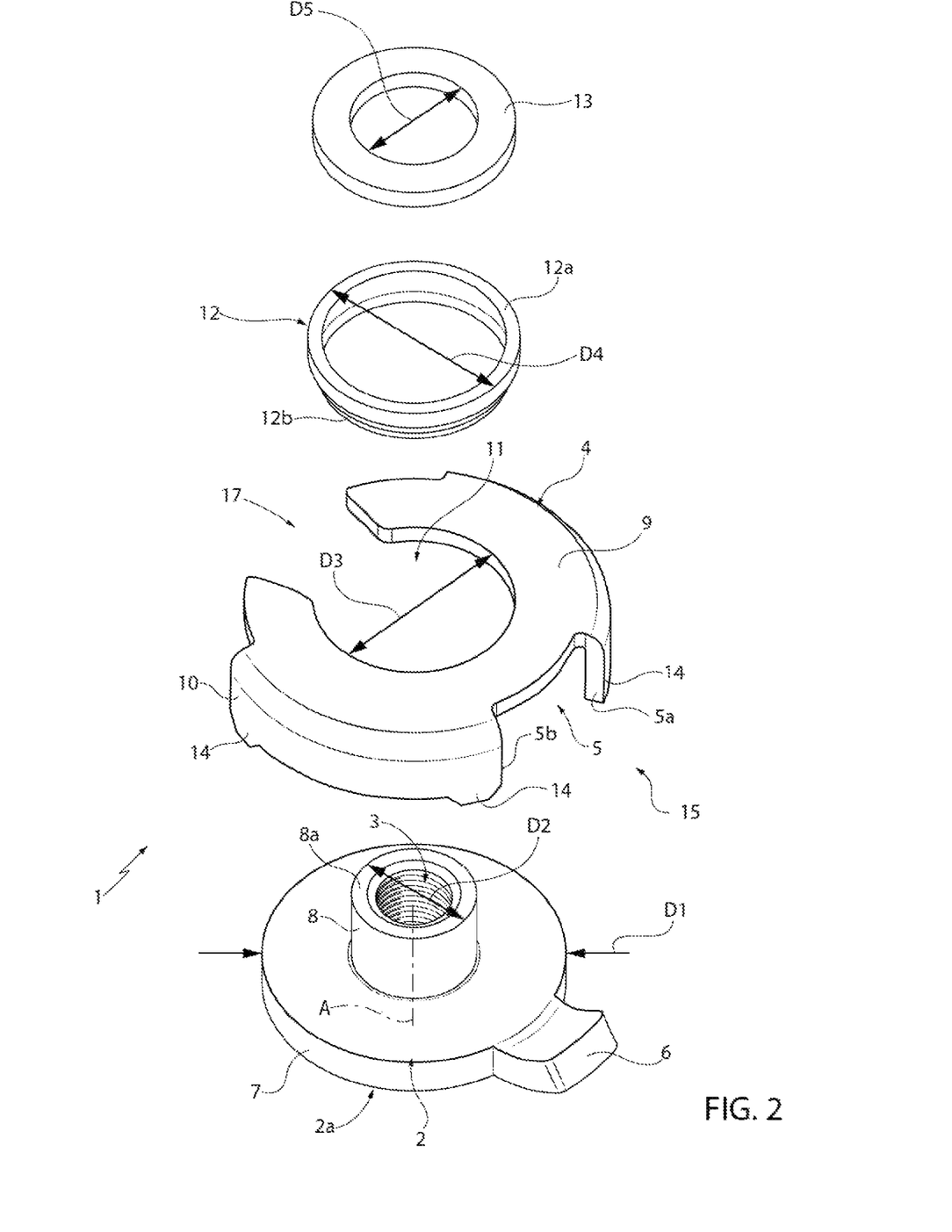
FIG. 2 is an exploded view of the bushing assembly of FIG. 1.

In FIG. 1, reference number 1 indicates a bushing assembly used to lock two components to one another by means of a connection screw, more specifically to tighten a screw 20 fixing the arm of a suspension to the frame of a vehicle. With reference to FIG. 2, the bushing assembly 1 comprises:
a bushing element 2 comprising a surface 2a, which is adapted to come into contact with a shoulder S of one of the two components (the frame, in the example shown herein), and a threaded hole 3, which is adapted to be engaged by the screw 20; and
a cage element 4, which is at least partially fitted around the bushing element 2, is adapted to be fixed to the shoulder S and is provided with an opening 5. Said opening 5 defines, in turn, an end abutment 5a.

The hole 3 is a through hole and defines, furthermore, a longitudinal axis A of the bushing assembly 1.

The bushing element 2 is supported by the cage element in a floating manner, namely the bushing element 2 is provided with an axial and/or radial and/or angular clearance relative to the cage element 4 before the mounting, namely before screwing the screw 20 into the hole 3.

In particular, the bushing assembly 1 is adapted to be placed and at least partially housed in a suitable, generally circular seat 30, which is defined by the shoulder S (FIG. 1). Furthermore, the hole 3 is adapted to be arranged so as to be coaxial to a not-shown hole made in the shoulder S.

First of all, it is possible to define a pre-mounted configuration of the bushing assembly 1, in which the cage element 4 is fixed to the shoulder S, the surface 2a is spaced apart from the shoulder S and the screw 20 is not tightened.

In addition, it is possible to define a tightening configuration of the bushing assembly 1, in which the cage element 4 is still fixed to the shoulder S, the surface 2a is in contact with the shoulder S and the screw 20 is tightened inside the threaded hole 3.

Hereinafter, if not indicated otherwise, the bushing assembly 1 will be described with reference to the pre-mounted configuration.

Advantageously, the surface 2a is circular and the bushing element 2 comprises an appendage element 6, which is distinct from the surface 2a and engages the opening 5 with a clearance. Said clearance is angular relative to the axis A.

By "circular" surface 2a, we mean that the perimeter thereof corresponds to a circumference.

Therefore, the bushing element 2 is movable, namely floating, around the axis A between an angular position I (FIG. 5A), in which the appendage element 6 is spaced apart from the abutment 5a, and an angular position II (FIG. 5B), in which the appendage element 6 is in contact with the abutment 5a.

Figure 5A:
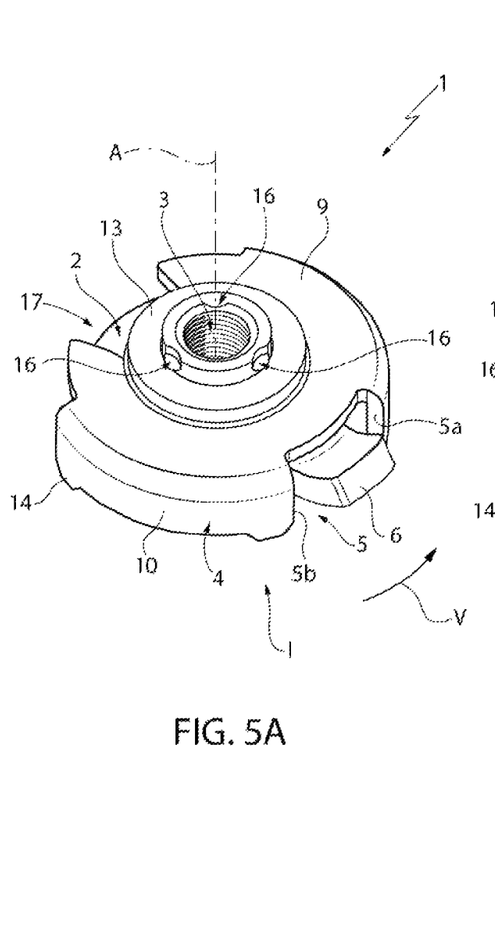
FIGS. 5A, 5B and 5C are axonometric views of the bushing assembly of FIGS. 1 to 3 in three respective different operating conditions.
Figure 5B:
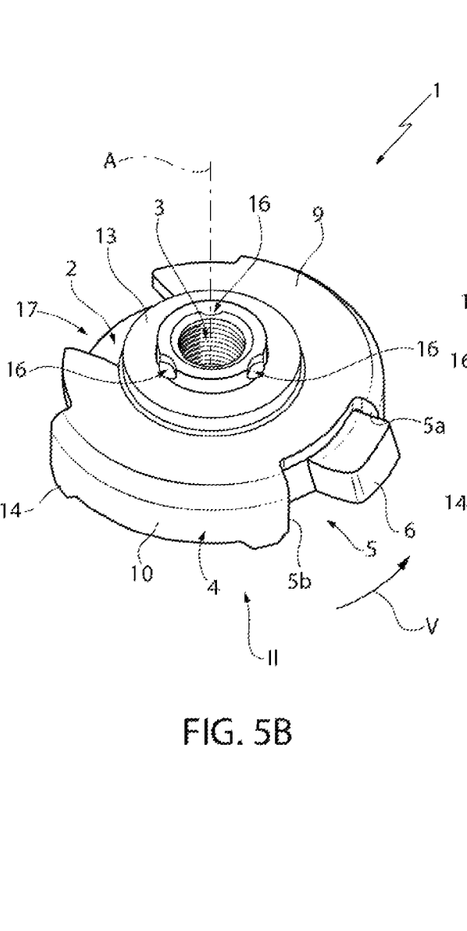

In particular, the angular positions I and II are angularly arranged one after the other in a screwing direction V, which is defined by the direction is which the screw 20 is rotated in the thread of the hole 3 (FIGS. 5A and 5B).

The abutment 5a is adapted to limit the rotation of the bushing element 2 in the rotation direction V. In detail, the abutment 5a prevents the bushing element 2 from rotating around the axis A past the angular position II in the direction V.

According to FIG. 2, the bushing element 2 comprises a portion 7 and a portion 8, which overlap one another along the axis A and are crossed by the hole 3.

In detail, the portion 7 comprises the surface 2a, at an axial end opposite the portion 8.

More in detail, the surface 2a is orthogonal to the axis A.

In the embodiment shown herein, the portions 7 and 8 are substantially cylindrical.

Furthermore, it is possible to define an outer diameter D1 pertaining to the portion 7 and an outer diameter D2 pertaining to the portion 8. The diameter D1 is greater than the diameter D2.

According to FIG. 2, the appendage element 6 is arranged at the portion 7. In particular, the appendage element 6 extends in a radial manner from the portion 7 relative to the axis A.

The appendage element 6, in the embodiment shown herein, is a tooth extending from the radially outer surface of the portion 7 relative to the axis A (FIG. 2).

The appendage element 6 further has a free end, which is axially spaced apart from an ideal plane on which the surface 2a of the bushing element 2 lies (FIG. 2). In particular, the appendage element 6 basically has a curved shape, which is distanced from the aforesaid ideal plane.

Figure 3:
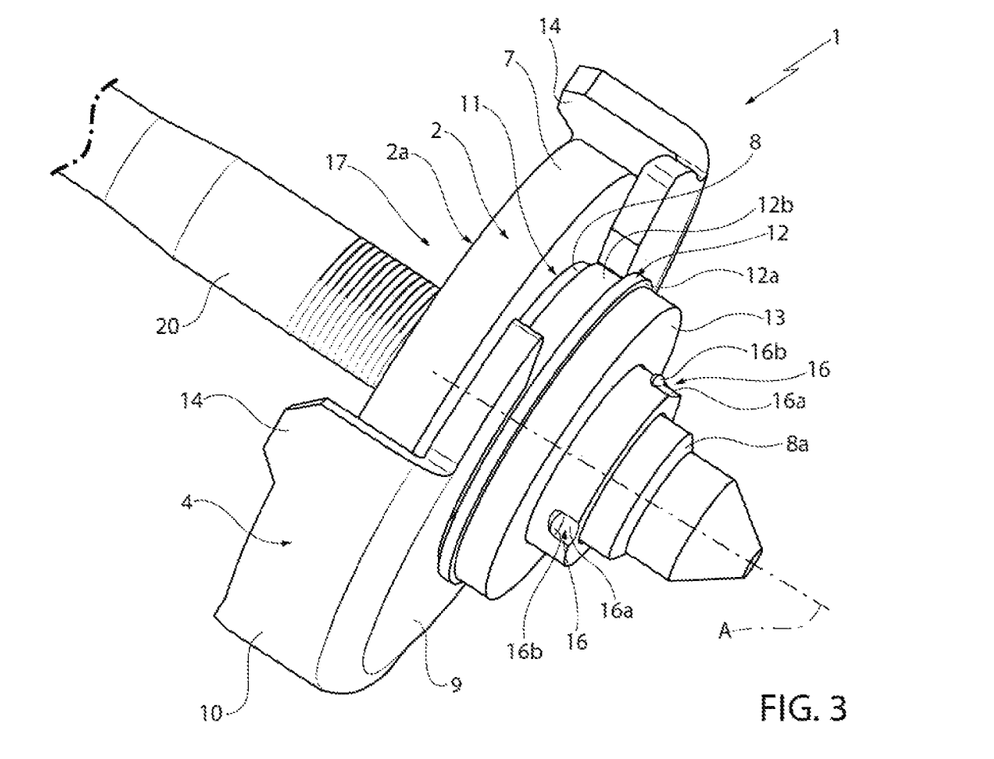
FIG. 3 is a perspective view of the bushing assembly of FIGS. 1 and 2 coupled to a screw.

According to FIG. 3, the cage element 4 comprises, in turn:
a wall 9, which is transverse to the axis A; and
a wall 10, which extends in a transverse manner from the wall 9 and radially external with respect to the bushing element 2 relative to the axis A.

With reference to FIG. 2, the opening 5 is formed at the wall 10 and, in particular, is defined by a notch in said wall 10.

The opening 5 further defines an abutment 5b.

In detail, the opening 5 extends along an angular sector 15 of the wall 10, which is delimited, in a circumferential direction, by the abutments 5a and 5b.

Figure 5C:
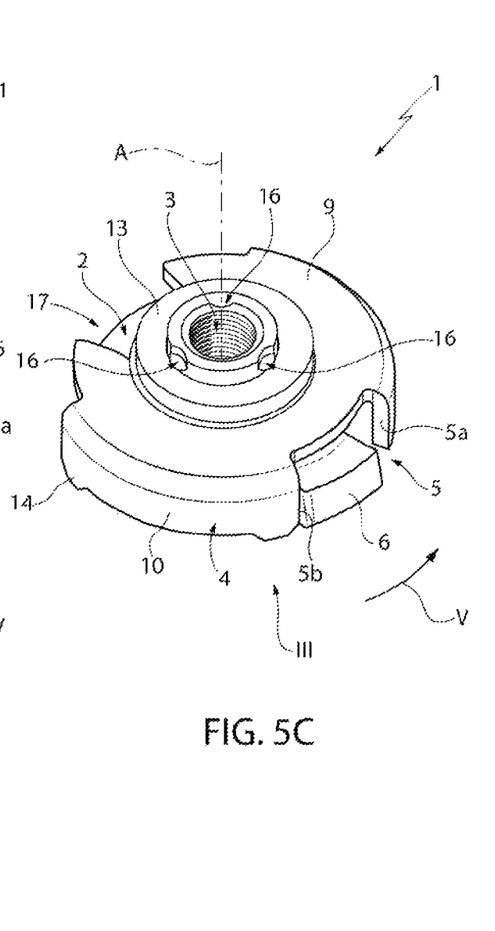

The bushing element 2 is floating around the axis A, so that it can reach an angular position III, in which the appendage element 6 is contact with the abutment 5b (FIG. 5C).

Therefore, the angular position I is defined by any intermediate position between the angular position III and the angular position II.

The abutments 5a and 5b are preferably shaped in an identical manner.

The cage element 4 is fixed, in use, to the shoulder S in a permanent manner, for example by means of a weld.

In particular, the cage element 4 is adapted to be fixed to the shoulder S at the wall 10 (FIG. 1).

In detail, the wall 10 comprises a plurality of projections 14 along an end edge opposite the wall 9, which are angularly spaced apart from one another about the axis A (FIG. 2).

More in detail, the cage element 4 is adapted to be fixed to the shoulder S at the projections 14.

In the embodiment shown herein, the wall 9 is flat and extends orthogonally to the axis A. The wall 10 is cylindrical and orthogonal to the wall 9. Furthermore, the walls 9 and 10 are joined to one another (FIG. 2).

The cage element 4 also has an opening 11, which is coaxial to the axis A, at the wall 9. In the embodiment shown herein, the opening 11 has a circular shape with a diameter D3 (FIG. 2).

In particular, the portion 8 of the bushing element 2 engages the opening 11 (FIG. 3).

The cage element 4 comprises a further opening 17 at the wall 9 and at the wall 10 (FIG. 3).

In the embodiment shown herein, the opening 17 is radially opposite the opening 5. In addition, the openings 11 and 17 are continuous with one another (FIG. 2).

The bushing assembly 1 further comprises a spacer 12 and a ring 13, which overlap one another and are fitted onto the portion 8 in a coaxial manner.

The spacer 12 at least partially engages the opening 11 and is interposed between the ring 13 and the wall 9 of the cage element 4 parallel to the axis A. The element 13, on the other hand, is completely external with respect to the cage element 4.

The spacer 12 and the ring 13 preferably have axial and radial clearance relative to the bushing element 2 and/or to the cage element 4.

The spacer 12 comprises, in turn, a first portion 12a and a second portion 12b, which overlap one another and are coaxial to one another (FIG. 2).

In detail, the spacer 12 is fitted on the portion 8 on the side of the portion 12b (FIG. 3).

The portions 12a and 12b are cylindrical and the portion 12a has an outer diameter D4, which is greater than the outer diameter of the portion 12b.

Furthermore, the diameter D4 is greater than the diameter D3 of the opening 11. As consequence, the portion 12a is always placed externally with respect to the cage element 4, whereas the portion 12b at least partially engages the opening 11 (FIG. 3).

In other words, the spacer 12 is fitted, in use, at the diameter D3 of the opening 11.

Furthermore, the ring 13 has an inner diameter D5, which is greater than or equal to the outer diameter D2 of the portion 8. Preferably, the diameter D5 is greater than the diameter D2.

Figure 4:
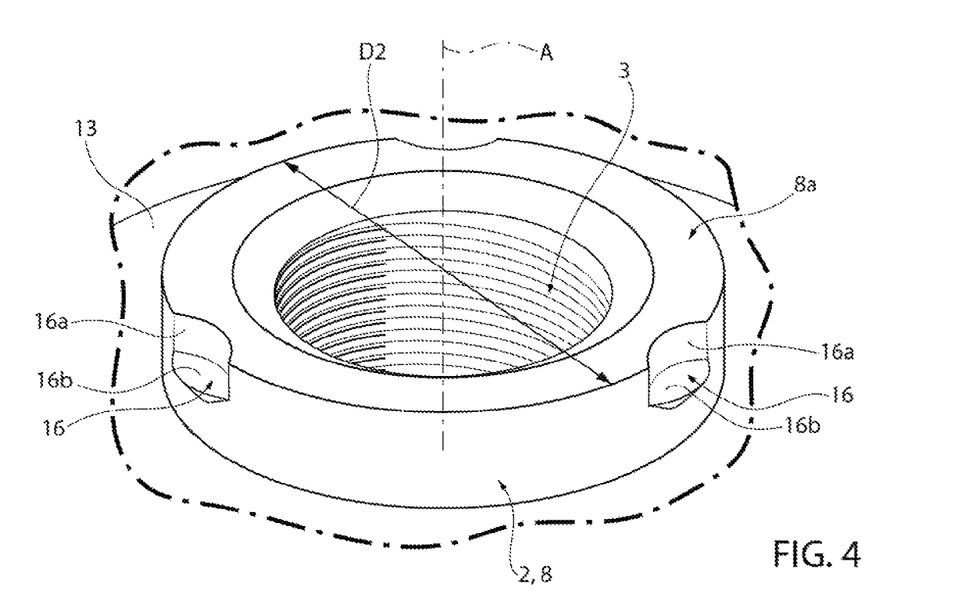
FIG. 4 is a detail of the bushing assembly of FIGS. 1 to 3.

According to FIGS. 1, 3 and 4, furthermore, the portion 8 has one or more plastic deformation regions 16, which are adapted to prevent the spacer 12 and the ring 13 from axially slipping off. These regions 16 are arranged at an end 8a of the portion 8 opposite the portion 7 along the axis A (FIG. 3).

In detail, the regions 16 are obtained, in use, after the spacer 12 and the ring 13 have been fitted onto the portion 8.

The regions 16 preferably are angularly spaced apart from one another relative to the axis A (FIG. 4).

In the embodiment shown herein, the regions 16 are obtained by means of cold forming.

In detail, each region 16 comprises a portion 16a, which is radially retracted relative to the outer diameter D2, and a portion 16b, which radially projects relative to the outer diameter D2 (FIGS. 3 and 4).

More in detail, each portion 16b radially protrudes relative to the axis A past the inner diameter D5 of the ring 13. In this way, each portion 16b prevents the spacer 12 and the ring 13 from axially slipping off.

An axial clearance is provided, which is such that, at least when the bushing assembly 1 is in the pre-mounted configuration, the ring 13 can axially slide between a position in which it is in contact with the portion 12a and a position in which it abuts against the portions 16b.

Furthermore, the bushing element 2 can be removed from the bushing assembly 1 even when the cage element 4 is fixed, in use, to the shoulder S, the spacer 12 is not fitted at the diameter D3 of the cage element 4 and the ring 13 has been removed from the bushing assembly 1. In detail, the bushing element 2 can be removed from the bushing assembly 1 through the opening 17 of the cage element 4 by means of a radial movement relative to the axis A (FIG. 3).

More in detail, the radial movement is oriented in the direction going from the opening 5 to the opening 17 so as to remove the appendage element 6 from the opening 5. Furthermore, the radial movement allows the portion 8 to be disengaged from the opening 11.

Indeed, the diameter D2 is smaller than the diameter D3 and than the minimum circumferential extension of the opening 17 in the area of the wall 9.

In addition, the diameter D1 is smaller than the circumferential extension of the opening 17 at the wall 10.

In particular, the spacer 12 prevents the bushing element 2 from being removed from the bushing assembly 1 when, in use, it is fitted on the portion 8, in the pre-mounted configuration. Indeed, the portion 12b engages the opening 11 and has an outer diameter that is greater than the minimum circumferential extension of the opening 17 in the area of the wall 9, so that it cannot radially slip out of the opening 11 through the opening 17.

Furthermore, obviously, the bushing element 2 cannot be removed from the bushing assembly 1 when, in use, the bushing assembly 1 is in the tightened configuration.

The mounting of the bushing assembly 1 is described hereinafter starting from a condition in which the bushing element 2, the cage element 4, the spacer 12 and the ring 13 are uncoupled from one another.

First of all, the cage element 4 is fitted around the bushing element 2.

In particular, the portion 8 is engaged in the opening of the cage element 4 and the appendage element 6 is engaged in the opening 5.

At this point, the spacer 12 and the ring 13 are fitted, on top of one another, onto the portion 8 so as to be coaxial to the axis A.

In particular, the spacer 12 is fitted onto the portion 8 on the side of the portion 12b and the portion 12a is abutted against the wall 9.

Subsequently, the plastic deformation regions 16 are obtained at the end 8a. In this way, the spacer 12 and the ring 13 are prevented from axially slipping off.

At this point, the cage element 4 is fixed to the shoulder S in the area of the wall 10.

In detail, the cage element 4 is fixed to the shoulder S at the projections 14.

In this condition, the bushing assembly 1 is in the pre-mounted configuration.

In particular, in this condition, the spacer 12, which is fitted on the portion 8, prevents the bushing element 2 from being removed from the bushing assembly 1.

When the bushing assembly 1 is in the pre-mounted configuration, it is possible, for example, to carry out painting operations of the frame of the vehicle.

In order to shift the bushing assembly 1 to the tightening configuration and fix the two components, the screw 20 is screwed into the threaded hole 3.

Since the bushing element 2 is floating, the bushing element 2 initially tends to rotate relative to the axis A in the screwing direction V together with the screw 20. In other words, the bushing element 2 rotates to the angular position III or to the angular position II (depending on whether the thread is a right-turning thread or a left-turning thread).

When the bushing element 2 reaches the angular position II (or III), the appendage element 6 abuts against the abutment 5a (or 5b) and prevents the bushing element 2 from further rotating in the screwing direction V.

As the screw 20 gets screwed into the hole 3, the surface 2a progressively gets closer to the shoulder S, until it comes into contact with the latter.

At this point, a further rotation of the screw up to the nominal tightening torque causes the surface 2a to be pressed against the shoulder S. Hence, the screw 20 is tightened to the bushing assembly 1, namely the bushing assembly 1 is in the tightening configuration.

The coupling between the surface 2a and the shoulder S defines an anti-unscrewing resistant torque, namely a torque that avoids an undesired unscrewing of the screw 20 and is a function of the extent of the area of contact between the surface 2a and the shoulder S.

In case the bushing element 2 needs to be removed or replaced starting from a condition in which the bushing assembly 1 is in the tightened configuration, the screw 20—first of all—needs to be unscrewed in the direction opposite the screwing direction V and to be removed from the hole 3.

Subsequently, the ring 13 must be axially removed from the portion 8. In order for this to be possible, the portions 16b must not prevent the ring 13 from slipping off. This can be obtained, for example, by breaking the ring 13 into two or more parts.

After having also axially removed the spacer 12 from the portion 8 so that it is not fitted any longer at the diameter D3 of the opening 11, the bushing element 2 can be removed from the bushing assembly 1, whereas the cage element 4 keeps being fixed to the shoulder S.

In detail, the bushing element 2 is removed from the bushing assembly 1 through the opening 17 by means of a radial movement relative to the axis A. This radial movement is oriented in the direction going from the opening 5 to the opening 17 and allows the appendage element 6 to be disengaged from the opening 5. The radial movement also allows the portion 8 to be disengaged from the opening 11, as mentioned above.

After having removed the bushing element 2 from the bushing assembly 1, the cage element 4 is not fitted any longer around the bushing element 2 and keeps remaining fixed to the shoulder S.

At this point, the bushing element 2 removed from the bushing assembly 1 can be replaced with a new bushing element 2 and, subsequently, the spacer 12 can be mounted again so as to lock the new bushing assembly in the opening 11 so that, finally, the screw 20 can be screwed again.

The features of the bushing assembly 1 according to the invention lead to evident advantages that can be obtained using it.

In particular, since the surface 2a is circular, it is possible to maximize the area of contact of said surface 2a and, hence, maximize the aforesaid anti-unscrewing resistant torque, with the same pull forces exerted upon the screw 20 at the end of the tightening and with the same dimensions of the seat S.

Furthermore, since the appendage element 6 is engaged with the opening 5 and limits the rotation of the bushing element 2 in the screwing direction V, it is possible to ensure an easiness of mounting of the bushing assembly 1.

Furthermore, the free end of the appendage element 6, as it is axially spaced apart from the ideal plane on which the surface 2a lies and, hence, from the shoulder S, does not interfere with the profile of the seat 30.

Therefore, the surface 2a and the portion 7 are no longer configured so as to limit the rotation of the bushing element 2 in the screwing direction, which, instead is the case with the bushing assembly described in U.S. Pat. No. 5,630,686, so that there is a greater freedom in defining their shape and dimensions in order to increase the aforesaid anti-unscrewing resistant torque.

Since the bushing element 2 can be removed from the bushing assembly 1 keeping the cage element 4 fixed to the shoulder S, when the spacer 12 and the ring 13 are not fitted on the portion 8, it is possible to replace a damaged or worn bushing element 2 without having to remove the cage element 4 from the shoulder S.

Finally, owing to the above, it is evident that the bushing assembly 1 described and shown herein can be subjected to changes and variations that do not go beyond the scope of protection of the invention, as set forth in the appended claims.

In particular, the plastic deformation regions 16 could be replaced by other means adapted to prevent the spacer 12 and/or the ring 13 from axially slipping off.

The invention claimed is:

1. A bushing assembly comprising:
   a bushing element comprising a first surface, which is adapted to come into contact with a shoulder, and a threaded hole, which is adapted to be engaged by a screw; said hole defining a longitudinal axis; and
   a cage element, which is at least partially fitted around said bushing element so that the bushing element is supported and is floating, the cage element being adapted to be fixed to said shoulder and being provided with at least one first opening; said first opening defining an end abutment of said cage element;
   said bushing element comprising at least one stop portion, which engages said first opening with an angular clearance; said bushing element being movable around said longitudinal axis at least between a first angular position, in which said stop portion is spaced apart from said abutment, and a second angular position, in which said stop portion is in contact with said abutment so as to prevent, in use, the bushing element from rotating past said second angular position;
   said stop portion being defined by an appendage element, which is distinct from said first surface; wherein said first surface is circular;
   wherein said cage element includes:
   a first wall, which is transverse to said longitudinal axis; and
   a second wall, which extends in a transverse manner from said first wall and radially external with respect to said bushing element relative to said longitudinal axis and is adapted to be fixed to said shoulder;
   said first opening being obtained at said second wall;
   wherein said cage element has a second opening, which is coaxial to said longitudinal axis at said first wall; said bushing element including a first portion and a second portion, which overlap one another and are crossed by said hole; said second portion engaging said second opening;
   said bushing assembly further including a spacer and a ring, which overlap one another and are fitted onto said second portion in a coaxial manner.

2. The bushing assembly according to claim 1, said first portion comprising said first surface at an axial end opposite said second portion; and
said first surface being orthogonal to said longitudinal axis.

3. The bushing assembly according to claim 2, wherein said appendage element is arranged at said first portion.

4. The bushing assembly according to claim 3, wherein said appendage element extends in a radial manner from said first portion relative to said longitudinal axis.

5. The bushing assembly according to claim 1, wherein said appendage element has a free end, which is axially spaced apart from an ideal plane on which said first surface lies.

6. The bushing assembly according to claim 1, characterized in that said first opening is defined by a notch in said second wall.

7. The bushing assembly according to claim 1, wherein said spacer at least partially engages said second opening and is interposed between said ring and said cage element along said longitudinal axis.

8. The bushing assembly according to claim 1, wherein said second portion has plastic deformation regions, which are adapted to prevent, in use, said spacer and said ring from slipping off;
   said plastic deformation regions being arranged at an end of the second portion opposite said first portion along said longitudinal axis.

9. The bushing assembly according to claim 1, wherein said bushing element can be removed from said bushing assembly when said cage element is fixed, in use, to said shoulder, said spacer is not fitted at said second opening and said ring is removed from said bushing assembly.

10. The bushing assembly according to claim 1, wherein said spacer is adapted to prevent, in use, said bushing element from being removed from said bushing assembly when, in use, it is fitted on said second portion.

11. A bushing assembly comprising:
    a bushing element comprising a first surface, which is adapted to come into contact with a shoulder, and a threaded hole, which is adapted to be engaged by a screw; said hole defining a longitudinal axis; and
    a cage element, which is at least partially fitted around said bushing element so that the bushing element is supported and is floating;
    said cage element comprising a first wall, which is transverse to said longitudinal axis; and a second wall, which extends orthogonally from said first wall and radially external with respect to said bushing element relative to said longitudinal axis;
    said second wall being adapted to be fixed to said shoulder and being provided with at least one first opening; said first opening defining an end abutment of said cage element, said bushing element comprising at least one stop portion, which engages said first opening with an angular clearance; said bushing element being movable around said longitudinal axis at least between a first angular position, in which said stop portion is spaced apart from said abutment, and a second angular position, in which said stop portion is in contact with said abutment so as to prevent, in use, the bushing element from rotating past said second angular position;

said stop portion being defined by an appendage element, which is distinct from said first surface;

wherein said first surface is circular and said second wall is cylindrical;

wherein said cage element has a second opening, which is coaxial to said longitudinal axis at said first wall; said bushing element comprising a first portion and a second portion, which overlap one another and are crossed by said hole; said second portion engaging said second opening; and said bushing assembly further including a spacer and a ring, which overlap one another and are fitted onto said second portion in a coaxial manner.

12. The bushing assembly according to claim 11,
said first portion comprising said first surface at an axial end opposite said second portion;
said first surface being orthogonal to said longitudinal axis.

13. The bushing assembly according to claim 12, wherein said appendage element is arranged at said first portion.

14. The bushing assembly according to claim 13, wherein said appendage element extends in a radial manner from said first portion relative to said longitudinal axis.

15. The bushing assembly according to claim 11, wherein said appendage element has a free end, which is axially spaced apart from an ideal plane on which said first surface lies.

16. The bushing assembly according to claim 11, wherein said bushing element can be removed from said bushing assembly when said cage element is fixed, in use, to said shoulder, said spacer is not fitted at said second opening and said ring is removed from said bushing assembly.

17. The bushing assembly according to claim 11, wherein said spacer is adapted to prevent, in use, said bushing element from being removed from said bushing assembly when, in use, it is fitted on said second portion.

18. The assembly according to claim 11, wherein said first opening extends along an angular sector of said second wall in a circumferential direction of said second wall;

said first opening extending parallel to said longitudinal axis from said first wall for the whole axial size of said second wall.

* * * * *